Patented August 2, 1966

3,264,058
PRODUCTION OF CALCIUM PHOSPHATES
Karl Geiersberger, Cologne-Deutz, and Ulrich Böhm, Cologne-Hohenhaus, Germany, assignors to Chemische Fabrik Kalk G.m.b.H., Cologne-Kalk, Germany
No Drawing. Filed Oct. 26, 1964, Ser. No. 406,536
2 Claims. (Cl. 23—108)

The present invention relates to an improved process for the production of calcium phosphates having a bulk density around 1, that is, between 0.7 and 1.3, from phosphoric acid and calcium nitrate or calcium chloride.

It is known that finely divided calcium phosphates can be prepared from solutions which contain calcium nitrate or calcium chloride and phosphoric acids in molar ratios of 1:1 to 1:2 by spraying such solutions into a hot gas stream. If the temperature of such gas stream is around 300° C., depending upon the molar ratios of the starting substances, either the mono- or dicalcium phosphate is produced with liberation of the volatile acid derived from the anion of the calcium salt. The liberation of the last portions of the volatile acid is rather slow so that most products produced still contain a small quantity of chlorides or nitrates. If the temperature of the gas stream is increased, products can be obtained which are free of chlorides or nitrates, but such products are extremely finely divided. When the starting solutions or suspensions are heated directly or indirectly without spraying them, the expulsion of the volatile acid becomes slower as the reaction proceeds. In this case of partial condensation of the phosphates takes place before the expulsion of the last remnants of the volatile acid occurs and the end product therefore contains varying quantities of undesired condensed phosphates. The prior art processes consequently either resulted in extremely fine particled products or products of lower purity.

Products for animal nutrition which require high purity of the calcium phosphates employed and bulk densities around 1 cannot be obtained with such processes.

According to the invention it was found that the above mentioned disadvantages of the prior art processes described can be overcome so as to be able to produce extremely pure products having a bulk density around 1, if the starting calcium nitrate or calcium chloride and phosphoric acid containing solution is first mixed with recycled calcium phosphate to form a crumbly "dry" mass and such crumbly mass is heated for 5 to 20 minutes while being kept in motion to a temperature of at most 250° C. and preferably to a temperature between 200 and 220° C. to drive off the volatile acid liberated.

The phosphoric acid employed according to the invention can be produced by thermal processes or in a wet process. The calcium nitrate or calcium chloride which is also used as a starting material can be produced by well known procedures. Advantageously, calcium nitrate can be used which was crystallized out from rock phosphate decomposition products acidified with nitric acid. Calcium chloride obtained in the Solvay soda process can be used with equal advantage in the process according to the invention. The purity requirements for the starting materials depend upon the purity desired in the end product. For example, if a calcium phosphate for use in animal nutrition is to be produced, it is necessary to employ a fluorine free or defluorinated phosphoric acid and calcium chloride or calcium nitrate which have been purified by known processes as the starting materials. If, on the other hand, calcium salts of phosphoric acid are to be produced for use in the preparation of fertilizers, the purity requirements for the starting materials are not as high.

In the process according to the invention a solution or suspension is first prepared from the phosphoric acid and the calcium nitrate or calcium chloride and such solution or suspension is then mixed in a ratio of 1:1 to 1:4 with dry recycled end product in such a way that a crumbly "dry" product is produced. This crumbly mass is then heated while being kept in motion for 5 to 20 minutes to a temperature of at most 250° C. and preferably to a temperature between 200 and 220° C. The latter preferably is effected in a drying drum which is heated directly or indirectly.

The nitric acid or hydrochloric acid which is set free while the crumbly mass is being heated is recovered in a known manner and can be used for the usual purposes. Only small quantities of the nitric acid liberated in the process according to the invention are decomposed to nitrous gases.

The products obtained according to the invention contain practically no nitric acid nitrogen or practically no chlorine. Their bulk densities are between 0.7 and 1.3 kg./l. When starting materials of sufficient purity are employed, the dicalcium phosphate produced according to the invention can be used directly for animal nutrition. The products according to the invention also do not contain any condensed phosphates.

The following examples will serve to illustrate the invention.

Example 1

120 parts by weight of $Ca(NO_3)_2$ were mixed with 85 parts by weight of $H_3PO_4$ (42% $P_2O_5$). The resulting mixture at 60° C. was mixed with 500 parts of dry dicalcium phosphate to form a crumby "dry" mass. Such crumbly mass was continuously supplied to a directly heated rotating drying drum. The material remained in the drying drum for 12 minutes and the temperature of the discharged product was 220° C. 570 parts by weight of dicalcium phosphate were produced, of which 500 parts by weight were recycled.

The dicalcium phosphate thus obtained contained 51.3% of $P_2O_5$, 40.7% CaO and 0.04% of N and was free of condensed phosphates. The bulk density of the product was 1.07 kg./l.

Example 2

570 parts by weight of calcium nitrate tetrahydrate obtained from the decomposition products of rock phosphate acidified with nitric acid were mixed with 305 parts by weight of phosphoric acid (54% $P_2O_5$) and then 1500 parts by weight of dry dicalcium phosphate were admixed therewith to give a crumbly "dry" mass. Such crumbly mass was continuously supplied to an indirectly heated rotating drying drum. The material remained in the drying drum for 15 minutes and when discharged its temperature was 200° C. 1825 parts by weight of dicalcium phosphate were produced, of which 1500 parts were recycled.

The dicalcium phosphate thus obtained contained 50.9% of $P_2O_5$, 40.2% of CaO and 0.08% of N and was free of condensed phosphates. The bulk density thereof was 0.95 kg./l.

The $HNO_3$ nitrous gas mixture produced was drawn off, the $HNO_3$ condensed and the nitrous gases used to manufacture nitric acid. In this way 490 parts by weight of $HNO_3$ (52%) were recovered and used for the decomposition of rock phosphate for the production of further $Ca(NO_3)_2 \cdot 4H_2O$.

Dicalcium phosphate of substantially the same quality is obtained when the calcium nitrate employed in the above examples is replaced by an equivalent quantity of calcium chloride.

Example 3

657 parts by weight of calcium chloride hexahydrate were mixed with 394 parts by weight of phosphoric acid (54% $P_2O_5$) and then 2332 parts by weight of dry dicalcium phosphate were admixed therewith to give a crumbly "dry" mass. Such crumbly mass was continuously supplied to an indirectly heated rotating drying drum. The material remained in the drying drum for 15 minutes and when discharged its temperature was 230° C. 2738 parts by weight of dicalcium phosphate were produced, of which 2332 parts were recycled.

The dicalcium phosphate thus obtained contained 50.5% $P_2O_5$, 41.0% CaO and 0.1% Cl and was free of condensed phosphates. The bulk density thereof was 1.1 kg./l.

The HCl gas was drawn off and used in the manufacture of hydrochloric acid.

Generally the temperature of the material in the drying drum shall be increased at least to 180° C. but not in excess of 250° C.

We claim:
1. In a process for producing calcium orthophosphates of a bulk density between about 0.7 and 1.3 from a solution containing phosphoric acid and a calcium salt selected from the group consisting of calcium chloride and calcium nitrate, the steps of mixing a sufficient quantity of recycled dry calcium orthophosphate with the starting solution containing the phosphoric acid and the calcium salt to form a crumbly dry mass and heating such crumbly mass while maintaining it in motion to a temperature not in excess of 250° C. for a period of 5 to 20 minutes to drive off the volatile acid formed from the anion of the calcium salt.

2. The process of claim 1 in which the molar ratio of the calcium salt and the phosphoric acid in the starting solution is from 1:1 to 1:2 and the temperature to which the crumbly mass is heated is between 200 and 220° C.

References Cited by the Examiner

UNITED STATES PATENTS

| | | | |
|---|---|---|---|
| 1,849,703 | 3/1932 | Boller | 23—109 X |
| 1,857,296 | 5/1932 | Eyer et al. | 23—109 X |
| 1,967,222 | 7/1934 | Arnold | 71—64 |
| 2,043,238 | 6/1936 | Curtis | 23—109 |
| 2,143,438 | 1/1939 | Fox | 23—109 |
| 2,287,758 | 6/1942 | Fox | 23—108 |
| 2,609,271 | 9/1952 | Plusje | 23—109 X |
| 2,882,127 | 4/1959 | Le Baron | 23—109 |
| 3,002,831 | 10/1961 | Gross et al. | 71—41 X |
| 3,011,888 | 12/1961 | Bridger | 23—109 X |

OTHER REFERENCES

Fox et al.: "The Chlorophosphate Process for Dicalcium Phosphate," Industrial and Engineering Chem., vol. 35, December 1943, pages 1264–1268.

OSCAR R. VERTIZ, *Primary Examiner.*

O. F. CRUTCHFIELD, *Assistant Examiner.*